United States Patent
Hu et al.

(10) Patent No.: US 9,508,162 B2
(45) Date of Patent: Nov. 29, 2016

(54) METHOD AND SYSTEM FOR RAPIDLY VECTORIZING IMAGE BY GRADIENT MESHES BASED ON PARAMETERIZATION

(75) Inventors: Shimin Hu, Beijing (CN); Yukun Lai, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 112 days.

(21) Appl. No.: 13/203,009

(22) PCT Filed: Jun. 2, 2010

(86) PCT No.: PCT/CN2010/000781
§ 371 (c)(1),
(2), (4) Date: Aug. 24, 2011

(87) PCT Pub. No.: WO2011/015029
PCT Pub. Date: Feb. 10, 2011

(65) Prior Publication Data
US 2012/0113098 A1    May 10, 2012

(30) Foreign Application Priority Data
Aug. 1, 2009  (CN) .......................... 2009 1 0172827

(51) Int. Cl.
*G06T 15/00* (2011.01)
*G06T 11/00* (2006.01)
(Continued)

(52) U.S. Cl.
CPC .............. *G06T 11/001* (2013.01); *G06T 9/00* (2013.01); *G06T 17/00* (2013.01); *G06T 19/00* (2013.01); *G06T 15/00* (2013.01); *G06T 15/10* (2013.01); *G06T 17/20* (2013.01)

(58) Field of Classification Search
CPC ....... G06T 19/00; G06T 17/20; G06T 19/20; G06T 17/00
See application file for complete search history.

(56) References Cited

U.S. PATENT DOCUMENTS 6,259,453 B1 * 7/2001 Itoh et al. ...................... 345/423
6,271,861 B1 * 8/2001 Sargent et al. ............... 345/589
(Continued)

FOREIGN PATENT DOCUMENTS

WO   WO 02/080110 A1   10/2002
WO   WO 2008137967 A1  11/2008

OTHER PUBLICATIONS

Interactive Geometry Remeshing, Journal ACM Transactions on Graphics (TOG)—Proceedings of ACM SIGGRAPH 2002 vol. 21 Issue 3, Jul. 2002 pp. 347-354 ACM New York, NY, USA, by: Alliez et al.*

(Continued)

*Primary Examiner* — Ulka Chauhan
*Assistant Examiner* — Saptarshi Mazumder
(74) *Attorney, Agent, or Firm* — Norton Rose Fulbright US LLP

(57) ABSTRACT

The present invention discloses a method for rapidly vectorizing an image by gradient meshes based on parameterization, which comprises the following steps: determining an image region to be vectorized (S1); converting the image region into a mesh representation (S2); mapping the meshes to a planar rectangular region by parameterizing the meshes (S3); and generating a gradient mesh image according to the parameterization result of said meshes (S4). The present invention generates gradient meshes by converting an image region into meshes and by parameterization, so the gradient meshes are obtained completely automatically without the need for the user to give original meshes and moreover, the computation speed is improved significantly since nonlinear optimization is avoided. In addition, the method of the present invention can process image regions containing or not containing holes.

9 Claims, 2 Drawing Sheets

(51) Int. Cl.
*G06T 19/00* (2011.01)
*G06T 17/00* (2006.01)
*G06T 9/00* (2006.01)
*G06T 17/20* (2006.01)
*G06T 15/10* (2011.01)

(56) References Cited

U.S. PATENT DOCUMENTS

| | | | | |
|---|---|---|---|---|
| 7,362,887 | B2* | 4/2008 | Oohashi et al. | 382/118 |
| 2002/0172406 | A1 | 11/2002 | Rouet et al. | |
| 2003/0036083 | A1* | 2/2003 | Tamez-Pena et al. | 435/6 |
| 2004/0164992 | A1* | 8/2004 | Gangnet et al. | 345/591 |
| 2006/0045336 | A1* | 3/2006 | Lim | 382/173 |
| 2006/0119599 | A1* | 6/2006 | Woodbury | 345/420 |
| 2008/0278479 | A1* | 11/2008 | Sun et al. | 345/419 |
| 2009/0184956 | A1* | 7/2009 | Kim et al. | 345/420 |

OTHER PUBLICATIONS

A Moving Mesh Approach to Stretch-Minimizing Mesh Parameterization, International Journal of Shape Modeling, vol. 11, Issue 01, Jun. 2005, by: Yoshizawa et al.*

Integral Invariant Signatures, T. Pajdla and J. Matas IEds.): ECCV 2004, LNCS 3024, pp. 87-99, 2004, by: Manay et al.*

(Journal Paper, Slit Map: Conformal Parameterization for Multiply Connected Surfaces, Advances in Geometric Modeling and Processing, Lecture Notes in Computer Science vol. 4975, 2008, pp. 410-422, by: Yin et al.*

@conference { 201, title ={A Local/Global Approach to Mesh Parameterization}, volume ={27 (5)}, year ={2008}, month ={Feb. 7, 2008}, pp. ={1495-1504}, publisher ={The Eurographics Association and Blackwell Publishing Ltd}, address ={Copenhagen, Denmark}, author ={Ligang Liu and Lei Zhang and Yin Xu and Craig Gotsman and Steven J. Gortler} }.*

Image Vectorization using Optimized Gradient Meshes Jian Sun, Lin Liang, Fang Wen, and Heung-Yeung Shum Jul. 2007.*

Fast hierarchical importance sampling with blue noise properties,ACM Transactions on Graphics (TOG)—Proceedings of ACM SIGGRAPH 2004 vol. 23 Issue 3, Aug. 2004 pp. 488-495 , by : Ostromoukhov et al.*

Notes on Mesh Parametrization:by Wei-Wen Feng, Nov. 3, 2004.*

Cai Q, Image Vectorization based on gradient Meshes, Master's Degree Thesis of Zhejiang University, Feb. 2009, pp. 20-21—Translation of pp. 20-21.

* cited by examiner

METHOD AND SYSTEM FOR RAPIDLY VECTORIZING IMAGE BY GRADIENT MESHES BASED ON PARAMETERIZATION

RELATED APPLICATIONS

This application is a §371 application of PCT/CN2010/000781 filed Jun. 2, 2010, which claims priority from Chinese Patent Application No. 200910172827.X filed Aug. 1, 2009.

TECHNICAL FIELD

The present invention relates to digital image processing technology fields, and more particularly, to a method for rapidly vectorizing image by gradient meshes based on parameterization and a system of the same.

BACKGROUND ART

A vector image, compared with a raster image with the same content as it has, has the feature of being independent of resolutions, and has advantages of being easy to edit and of higher compression ratio, etc. Currently, the study on raster image vectorization is preliminary, only that on binary image and engineering image vectorization is mature, and it is still a challenging problem to vectorize a general image. Gradient meshes, as a way of vectorized representation of an image, can be provided by software like Corel Draw and Adobe Illustrator. Generally, obtaining gradient meshes requires a large number of user interactions. The US patent application of Sun, Jian et al. (which application number is PCT/US2008/062970) proposed a method based on nonlinear optimization. However, the method requires user interactions to give original gradient meshes with a relatively low speed

CONTENTS OF THE INVENTION

Aiming at the above disadvantages of prior art, the purpose of the present invention is to provide a method and system for vectorizing an image by gradient meshes, by which the vectorized representation by gradient meshes of given image regions can be obtained automatically without the need for the user to provide original gradient meshes. The method according to the present invention allows simultaneously processing image regions containing or not containing holes.

In order to solve the above technical problems, the present invention provides a method for rapidly vectorizing image by gradient meshes based on parameterization, comprising the following steps:

S1, determining an image region to be vectorized;
S2, converting the image region into mesh representations;
S3, mapping the meshes to a planar rectangular region by mesh parameterization; and
S4, generating a gradient mesh image according to the results of said mesh parameterization.

Wherein, step S1 may particularly comprise: selecting an image region to be vectorized by combining user interactions with matting methods.

Wherein, step S2 may particularly comprise:
B1. for each pixel in the selected image region, calculating the weight of each pixel by using the Sobel operator;
B2. distributing the sampling points by error diffusion;
B3. obtaining the connections among the meshes by using the Delaunay triangulation.

Wherein, step S3 may particularly comprise:
C1. mapping four corners of the meshes to four endpoints of a rectangle;
C2. mapping the boundary of said mesh to the edge of a rectangular region;
C3. mapping the internal vertexes of the mesh to the rectangular region by parameterization, Wherein, step S4 may particularly comprise:
D1. sampling in the rectangular region uniformly, placing a control vertex of the gradient mesh at each lattice point of the rectangular region, and determining the coordinate of the control vertex and its gradient by using mapping relationship between parameters;
D2. determining the color values and color gradients at the control vertex by using color sampling and interpolation.

Wherein, the number of the sampling points may be 1/10 of the number of the pixels in the selected image region.

Wherein, step C2 may particularly comprise: mapping each vertex on the outer boundary of the mesh to the edge of the rectangular region in accordance with the principle of equal scaling.

Wherein, step C3 may particularly comprise: if the image region does not contain hole, a parameterization method with minimized stretch is used for solving the internal vertexes of the mesh; If the image region contains holes, for said internal vertexes of the mesh, a parameterization method based on Slit Map is used to map the inner holes to horizontal slits, and then a re-parameterization method with minimized stretch is used to determine the position of the vertexes.

Wherein, the color gradients may be obtained by interpolating the colors of adjacent sampling points for three times.

Wherein, step C1 may particularly comprise:
calculating the major component of the image region, and bounding the image region by a rectangular bounding box in a direction parallel to the major component. assuming $c_i$ as the point closest to the four corners of the rectangle from the edge of the image, placing a disk of radius r at each pixel on the edge of the image, and counting the number of the pixels within the disk in the image region, recorded as $n(\hat{c}_i)$ where $c_i$ is the central pixel of the disk, i=1, 2, 3, 4. Finding a pixel $\bar{c}_i$ satisfying the following formula to make the pixel $\bar{c}_i$ close to the point which is closest to the four corners:

$$\bar{c}_i = \underset{\hat{c}_i}{\operatorname{argmin}} \left| n(\hat{c}_i) - \frac{1}{4}\pi r^2 \right| + \lambda \|\hat{c}_i - c_i\|$$

Here, λ and r are predetermined parameters respectively.

The present invention also provides a system for rapidly vectorizing image by gradient meshes based on parameterization, comprising:

an image region selecting unit used for determining an image region to be vectorized;
an image-mesh converting unit used for converting the corresponding image region into mesh representations;
a parameterization unit used for mapping the meshes to a planar rectangular region by mesh parameterization; and
a gradient mesh generating unit used for generating a gradient mesh image according to the results of said mesh parameterization.

SPECIFIC MODE FOR CARRYING OUT THE INVENTION

Hereinafter, the specific mode for carrying out the invention is described in detail with reference to the accompanying drawings and embodiments. The following embodiments are provided by way of explaining the invention but not limiting its scope.

As shown in FIG. 1, the method for rapidly vectorizing image by gradient meshes based on parameterization comprises:

Figure 1:
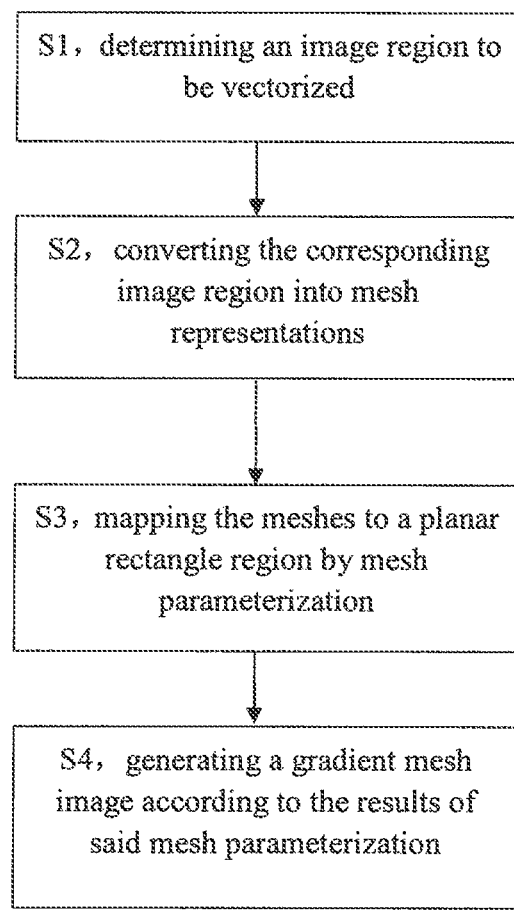
FIG. 1 is a flow chart illustrating the method according to the embodiment of the present invention.

S1, determining an image region to be vectorized;

S2, converting the corresponding image region into mesh representations, such as a triangular mesh;

S3, mapping the meshes to a planar rectangular region by mesh parameterization; and S4, generating a gradient mesh image according to the results of said mesh parameterization.

Wherein, step S1 particularly comprises: selecting an image region to be vectorized by combining user interactions with matting methods. For example, the user renders the image region to be processed by using lasso tools, or the user selects a foreground region and a background region, and determines the exact boundary of the region to be processed by using matting methods like image segmentation. Here, assuming that the region to be processed is a connected region and only contains one boundary.

In this embodiment, step S2 particularly comprises:

B1. for each pixel in the selected image region, calculating the weight of each pixel by using the Sobel operator;

B2. specifying the number of sampling points to be 1/10 of the number of pixels in the region by the weight calculated previously, and randomly acquiring the specified number of sampling points by error diffusion;

B3. obtaining the connections among the meshes by triangulation. For example, for the point set containing above sampling points and all the boundary points, a constrained Delaunay algorithm is used to obtain the connections between the points, in order to make them form planar triangular meshes, and the boundary of the image region is used as a constraint to make the boundary of the generated triangular meshes consistent with the original region.

In this embodiment, step S3 particularly comprises:

C1. mapping four corners of the mesh to four endpoints of a rectangle;

C2. mapping the boundary of said mesh to the edge of a rectangular region;

C3. mapping the internal vertexes of the mesh to the rectangular region by parameterization.

In this embodiment, step S4 particularly comprises:

D1. sampling in the rectangular region evenly, placing a control vertex of the gradient mesh at each lattice point of the rectangular region, and determining the coordinate of the control vertex and its gradient by using the mapping relationship between parameters;

D2. determining the color values and color gradients at the control vertex by using color sampling and interpolation.

In this embodiment, the number of the sampling points is 1/10 of the number of the pixels in the selected image region.

In this embodiment, step C2 particularly comprises: mapping each vertex on the outer boundary of the mesh to the edge of the rectangular region in accordance with the principle of equal scaling.

In this embodiment, step C3 particularly comprises: for the image region containing inner holes (and the corresponding meshes), the parameterization method based on Slit Map is used to map the inner holes to horizontal slits. The parameterization method with minimized stretch is used to determine the position of the internal vertexes of the triangular mesh.

In this embodiment, the color gradients are obtained by interpolating the colors of adjacent sampling points for three times.

In this embodiment, the step of "mapping four corners of the boundary of the mesh to four endpoints of a rectangle" is particularly performed by:

calculating the major component of the image region, and bounding the image region by a rectangular bounding box in a direction parallel to the major component; assuming $c_i$ is the point closest to the four corners of the rectangle from the edge of the image, placing a disk of radius r at each pixel on the edge of the image, and counting the pixels within the disk in the image region, recorded as $n(\hat{c}_i)$, where $\hat{c}_i$ is the central pixel of the disk, i=1, 2, 3, 4; finding a pixel $\bar{c}_i$ satisfying the following formula to make the pixel $\bar{c}_i$ close to the point which is closest to the four corners, and make its shape approximate to that of the corners of the rectangle (the angle is approximate to 90 degree):

$$\bar{c}_i = \underset{\hat{c}_i}{\operatorname{argmin}} \left| n(\hat{c}_i) - \frac{1}{4}\pi r^2 \right| + \lambda \|\hat{c}_i - c_i\|$$

Here, λ and r are predetermined parameters respectively, for example, it can be set that λ=0.1, r=5.

For all the vertexes in the meshes, they are mapped to the vector f=(x, y, wdc/dx, wdc/dy) in a 8-dimensional space, wherein x, y are the coordinate of the vertex in the image, c=(r, g, b) is a 3-dimensional vector with the three components being the red, green and blue components of the color of the pixels at the vertexes respectively, w is a given constant which is used to balance the fitting error and the mesh regularity, and generally may be set as 300. The distance between two adjacent vertexes is defined as ||f1−f2||2. f1 and f2 are vectors representing mapping two certain vertexes in the mesh to a 8-dimensional space, respectively. The said metric (distance ||f1−f2||2) is used in steps C2 and C3 to replace general Euclidean metric in order to ensure that the results of parameterization can reflect the degree of difficulties for local region fitting. The image regions which are hard to fit will take up larger parameterization areas, which makes these regions automatically obtain relatively compact control meshes after sampling.

Figure 2:
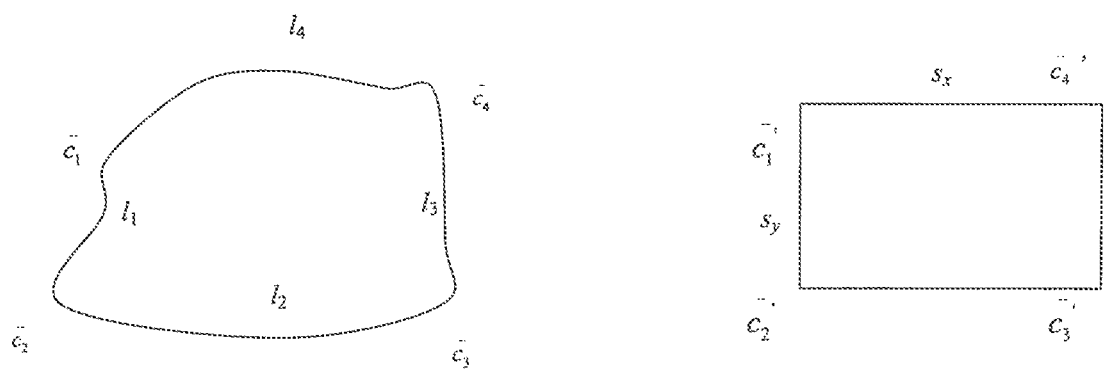
FIG. 2 is a schematic diagram illustrating the parameterization process of processing the image region not containing holes according to the embodiment of the present invention.

FIG. 2 is a schematic diagram illustrating the parameterization process of processing the image region not containing holes according to the embodiment of the present invention. As shown in FIG. 2, the corner of the mesh $\bar{c}_i$ (i=1, 2, 3, 4) calculated above is mapped to four endpoints $\bar{c}_i'$ (i=1, 2, 3, 4) of the planar rectangular region; the length of the corresponding boundary of the mesh is $l_i$ (i=1, 2, 3, 4) respectively, and the length of the edge of the mapped rectangular region is $s_x=(l_2+l_4)/2$, $s_y=(l_1+l_3)/2$ respectively, and each vertex on the boundary of the mesh is mapped to the edge of the rectangular region in accordance with the principle of equal scaling; determining the position of the internal vertexes of the mesh by using the parameterization method with minimized stretch. In the above calculation, all the used distances (metrics) are Euclidean distances in the 8-dimensional space as defined herein. When mapping the internal vertexes of the mesh, the position of each internal vertex, after mapping is optimized, with respect to the Euclidean metrics in the given 8-dimensional space, which makes the whole stretch before and after mapping minimized.

Figure 3:
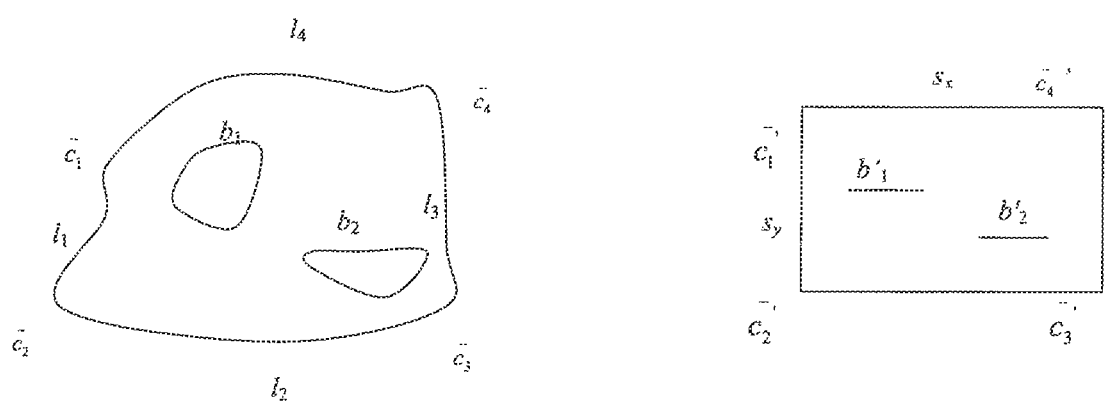
FIG. 3 is a schematic diagram illustrating the parameterization process of processing the image region with holes therein according to the embodiment of the present invention.

FIG. 3 is a schematic diagram illustrating the parameterization based on Slit Map. For the image region containing inner holes (see the left-hand figure), $\overline{c_1 c_2}$ and $\overline{c_3 c_4}$ are re-sampled to be containing the same number of sampling points, and pasted to form a topological cylinder containing holes according to the point-to-point correspondence, and mapped into the rectangular region as shown in the right-hand by using Slit Map parameterization method, wherein the inner holes are mapped to horizontal slits. Based on this, in the same case as that where no hole is contained, the positions of the internal vertexes are determined by using the parameterization method based on minimized stretch.

The present invention also provides a system for rapidly vectorizing image by gradient meshes based on parameterization, which conducts image vectorization by using above method and comprises:

an image region selecting unit used for determining the image region to be vectorized;

an image-mesh converting unit used for converting the corresponding image region into mesh representations;

a parameterization unit used for mapping the meshes to a planar rectangular region by mesh parameterization; and a gradient mesh generating unit used for generating a gradient mesh image according to the results of the mesh parameterization.

The embodiments of the present invention generate gradient meshes by converting an image region into meshes in combination with parameterization, and the experimental results show that, in the method according to the embodiments of the present invention, the gradient meshes are obtained completely automatically without the need for the user to provide original meshes; moreover, the computation speed is improved significantly since nonlinear optimization is avoided.

The above embodiments are only preferred ones, and hence it should be indicated that those ordinary skilled in the art may also conduct various modifications and variations without departing from technical principle of the present invention, which shall also be regarded as the protection scope of the present invention.

INDUSTRIAL APPLICABILITY

The technical solutions of the present invention have the following advantages: it generates gradient meshes by converting an image region into meshes in combination with parameterization, so the gradient meshes are obtained completely automatically without the need for the user to provide original meshes; moreover, the computation speed is improved significantly since nonlinear optimization is avoided. In addition, the method according to the present invention can process image regions containing or not containing holes.

The invention claimed is:

1. A method for rapidly vectorizing image by gradient meshes based on parameterization, comprising the steps of:

S1 determining an image region to be vectorized;

S2 converting said image region into triangular mesh representations;

S3 mapping the mesh representations to a planar rectangular region by mesh parameterization; and S4 generating a gradient mesh image according to the results of said mesh parameterization without an initially-created gradient mesh, wherein step S4 comprises sampling in the rectangular region evenly and, based on the even sampling, placing a control vertex of the gradient mesh at each lattice point of the rectangular region and determining the coordinate of the control vertex and its gradient by using the mapping relationship between parameters, wherein said step S3 comprises:

C1 mapping four corners of the mesh to four endpoints of the rectangular region;

C2 mapping boundaries of said mesh to edges of the rectangular region; and

C3 mapping internal vertexes of the mesh into the rectangular region by parameterization, and wherein said step C1 comprises:

calculating a major component of said image region, and bounding said image region by using a rectangular bounding box in a direction parallel to the major component;

wherein, assuming $c_i$, in the edges of the image, is the point closest to the four corners of the rectangular bounding box;

placing a disk of radius r at each pixel on the edges of the image, and counting pixels within the disk in the image region, denoted as $n(\hat{c}_i)$, where $\hat{c}_i$ is a central pixel of the disk, i=1, 2, 3, 4; and finding a pixel $\hat{c}_i$ satisfying the following formula to make the pixel $\overline{c}_i$ close to the point which is closest to the four corners:

$$\overline{c}_i = \mathrm{argmin}_{\hat{c}_i} \left| n(\hat{c}_i) - \frac{1}{4}\pi r^2 \right| + \lambda \|\hat{c}_i - c_i\|,$$

wherein $\lambda$ and r are predetermined parameters respectively.

2. The method for rapidly vectorizing image by gradient meshes based on parameterization of claim 1, wherein said step S2 comprises:

B1 for each pixel in said image region, calculating a weight of each pixel by using a Sobel operator;

B2 distributing sampling points by using error diffusion;

B3 obtaining connections among the meshes by using Delaunay triangulation.

3. The method for rapidly vectorizing image by gradient meshes based on parameterization of claim 2, wherein the number of said sampling points is 1/10 of the number of the pixels in the selected image region.

4. The method for rapidly vectorizing image by gradient meshes based on parameterization of claim 1, wherein said step S4 further comprises:

D2 determining color values and color gradients at said control vertex by using color sampling and interpolation.

5. The method for rapidly vectorizing image by gradient meshes based on parameterization of claim 4, wherein said color gradients are obtained by interpolating the colors of adjacent sampling points for three times.

6. The method for rapidly vectorizing image by gradient meshes based on parameterization of claim 1, wherein said step C2 comprises: mapping each vertex on outer boundaries of the mesh to the edges of the rectangular region in accordance with the principle of equal scaling.

7. The method for rapidly vectorizing image by gradient meshes based on parameterization of claim 1, wherein said step C3 comprises: if the image region contains no hole, a parameterization method with minimized stretch is used for determining said internal vertexes of the mesh.

8. The method for rapidly vectorizing image by gradient meshes based on parameterization of claim 1, wherein said step C3 comprises: if the image region contains holes, for internal vertexes of the mesh, a parameterization method based on Slit Map is used to map the inner holes to horizontal slits, and then a re-parameterization method with minimized stretch is used to determine positions of the vertexes.

9. A system for rapidly vectorizing image by gradient meshes based on parameterization, which comprises:
    an image region selecting unit configured to determine an image region to be vectorized;
    an image-mesh converting unit configured to convert said image region into triangular mesh representations;
    a parameterization unit configured to map the meshes to a planar rectangular region by mesh parameterization; and
    a gradient mesh generating unit configured to generate a gradient mesh image according to the results of said mesh parameterization without an initially-created gradient mesh, wherein the gradient mesh generating unit being configured to generate a gradient mesh image comprises the gradient mesh generating unit being configured to sample in the rectangular region evenly and, based on the even sampling, place a control vertex of the gradient mesh at each lattice point of the rectangular region, and determine the coordinate of the control vertex and its gradient by using the mapping relationship between parameters,
wherein the parameterization unit is configured to perform steps comprising:
    mapping four corners of the mesh to four endpoints of the rectangular region;
    mapping boundaries of said mesh to edges of the rectangular region; and
    mapping internal vertexes of the mesh into the rectangular region by parameterization, and
wherein the image region selecting unit is configured to perform steps comprising:
    calculating a major component of said image region, and bounding said image region by using a rectangular bounding box in a direction parallel to the major component;
    wherein, assuming $c_i$, in the edges of the image, is the point closest to the four corners of the rectangular bounding box;
    placing a disk of radius r at each pixel on the edges of the image, and counting pixels within the disk in the image region, denoted as $n(\hat{c}_i)$, where $\hat{c}_i$ is a central pixel of the disk, i=1, 2, 3, 4; and
    finding a pixel $\hat{c}_i$ satisfying the following formula to make the pixel $\bar{c}_i$ close to the point which is closest to the four corners:

$$\bar{c}_i = \operatorname{argmin}_{\hat{c}_i} \left| n(\hat{c}_i) - \frac{1}{4}\pi r^2 \right| + \lambda \|\hat{c}_i - c_i\|,$$

wherein λ and r are predetermined parameters respectively.

* * * * *